US009578086B2

(12) United States Patent
Jung et al.

(10) Patent No.: US 9,578,086 B2
(45) Date of Patent: Feb. 21, 2017

(54) METHOD AND APPARATUS OF SETTING DATA TRANSMISSION AND RECEPTION PERIOD

(71) Applicant: Samsung Electronics Co. Ltd., Suwon-si, Gyeonggi-do (KR)

(72) Inventors: Bu-Seop Jung, Suwon-si (KR); Jung-Hun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 330 days.

(21) Appl. No.: 14/027,707

(22) Filed: Sep. 16, 2013

(65) Prior Publication Data

US 2014/0082213 A1    Mar. 20, 2014

(30) Foreign Application Priority Data

Sep. 20, 2012   (KR) ........................ 10-2012-0104769

(51) Int. Cl.
  *G06F 15/16*   (2006.01)
  *H04L 29/08*   (2006.01)
  *H04W 52/02*   (2009.01)
(52) U.S. Cl.
  CPC .......... *H04L 67/06* (2013.01); *H04W 52/0216* (2013.01)
(58) Field of Classification Search
  CPC ................... H04W 52/0225; H04W 72/1215; H04W 88/10; H04W 88/06; H04W 88/04; H04W 52/0216; Y02B 60/50; H04L 67/06
  See application file for complete search history.

(56) References Cited

U.S. PATENT DOCUMENTS

| 8,391,260 B1* | 3/2013 | Kopikare ............. H04W 8/005 370/338 |
| 2010/0278065 A1 | 11/2010 | Sun et al. |
| 2010/0278087 A1* | 11/2010 | Kawakami ........ H04W 52/0216 370/311 |
| 2012/0106381 A1* | 5/2012 | Vedantham .......... H04L 1/1854 370/252 |
| 2012/0178429 A1 | 7/2012 | Camps Mur et al. |
| 2013/0077558 A1* | 3/2013 | Ukita .................... H04W 16/26 370/315 |
| 2013/0238919 A1* | 9/2013 | Ponmudi ........... H04W 52/0216 713/323 |
| 2014/0032951 A1* | 1/2014 | Garg ................. H04W 52/0219 713/323 |

FOREIGN PATENT DOCUMENTS

| WO | 2008/136640 A2 | 11/2008 |
| WO | 2008/136640 A3 | 11/2008 |

* cited by examiner

Primary Examiner — Cheikh Ndiaye
(74) Attorney, Agent, or Firm — Jefferson IP Law, LLP

(57) ABSTRACT

A method and an apparatus for setting a data transmission and reception period are provided. The method includes determining an average margin threshold for data communication with a second terminal, determining a data rate for the data communication with the second terminal, setting an active period and an idle period based on a ratio of the average margin threshold to the data rate, and synchronizing the active period and the idle period with the second terminal.

13 Claims, 6 Drawing Sheets

METHOD AND APPARATUS OF SETTING DATA TRANSMISSION AND RECEPTION PERIOD

CROSS-REFERENCE TO RELATED APPLICATION(S)

This application claims the benefit under 35 U.S.C. §119 (a) of a Korean patent application filed on Sep. 20, 2012 in the Korean Intellectual Property Office and assigned Serial No. 10-2012-0104769, the entire disclosure of which is hereby incorporated by reference.

TECHNICAL FIELD

The present disclosure relates to a wireless communication method and apparatus. More particularly, the present disclosure relates to a method and an apparatus for setting a wireless data transmission and reception period and an idle period.

BACKGROUND

Wireless Fidelity (Wi-Fi) Direct has recently been proposed in order to support enhanced and convenient connectivity between devices, compared to Wi-Fi technology of the related art. In addition, new Wi-Fi Display (WFD) specifications have been developed in order to satisfy high quality and low latency between Wi-Fi terminals and enable transmission of audio/video data.

In Wi-Fi Direct, Wi-Fi terminals act as a Group Owner (GO), like an access point, or a Group Client (GC), like a station during a peer-to-peer Wi-Fi communication. In WFD, a source terminal provides streaming data and a sink terminal receives streaming data. In an environment where devices are connected by WFD, in the presence of a single sink terminal, a source terminal may be a GO or GC. However, if sink terminals are divided into an audio processing terminal and a video processing terminal, a source terminal should be a GO. However, if a mobile terminal serves as a source terminal and a GO, high power consumption is problematic to the mobile terminal having a relatively low power source.

Therefore, a need exists for a method and an apparatus for stably transmitting and receiving data with relatively low power.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for stably transmitting and receiving data with relatively low power.

Another aspect of the present disclosure is to provide a method and an apparatus for measuring a radio channel environment without a complicated operation or performance degradation by effectively predicting the radio channel environment using the transmission rate of data output from a transmission buffer.

In accordance with an aspect of the present disclosure, a method of setting a data transmission and reception period for communication with a second terminal in a first terminal is provided. The method includes determining an average margin threshold for data communication with the second terminal, determining a data rate for the data communication with the second terminal, setting, an active period and an idle period based on a ratio of the average margin threshold to the data rate, and synchronizing the active period and the idle period with the second terminal.

In accordance with another aspect of the present disclosure, an apparatus for setting a data transmission and reception period for communication is provided. The apparatus includes an average margin decider configured to determine an average margin threshold for data communication with a terminal, a data rate decider configured to determine a data rate for the data communication with the terminal, a NOA decider configured to set an active period and an idle period based on a ratio of the average margin threshold to the data rate, a communication controller configured to control data transmission and an idle-mode operation according to the active period and the idle period, and a data transceiver configured to transmit and receive data under the control of the communication controller.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Various embodiments will be provided to describe the technical aspects of the present disclosure. In an implementation, defined entities may have the same names, to which the present disclosure is not limited. Thus, embodiments of the present disclosure can be implemented with same or ready modifications in a system having a similar technical background.

Figure 1:
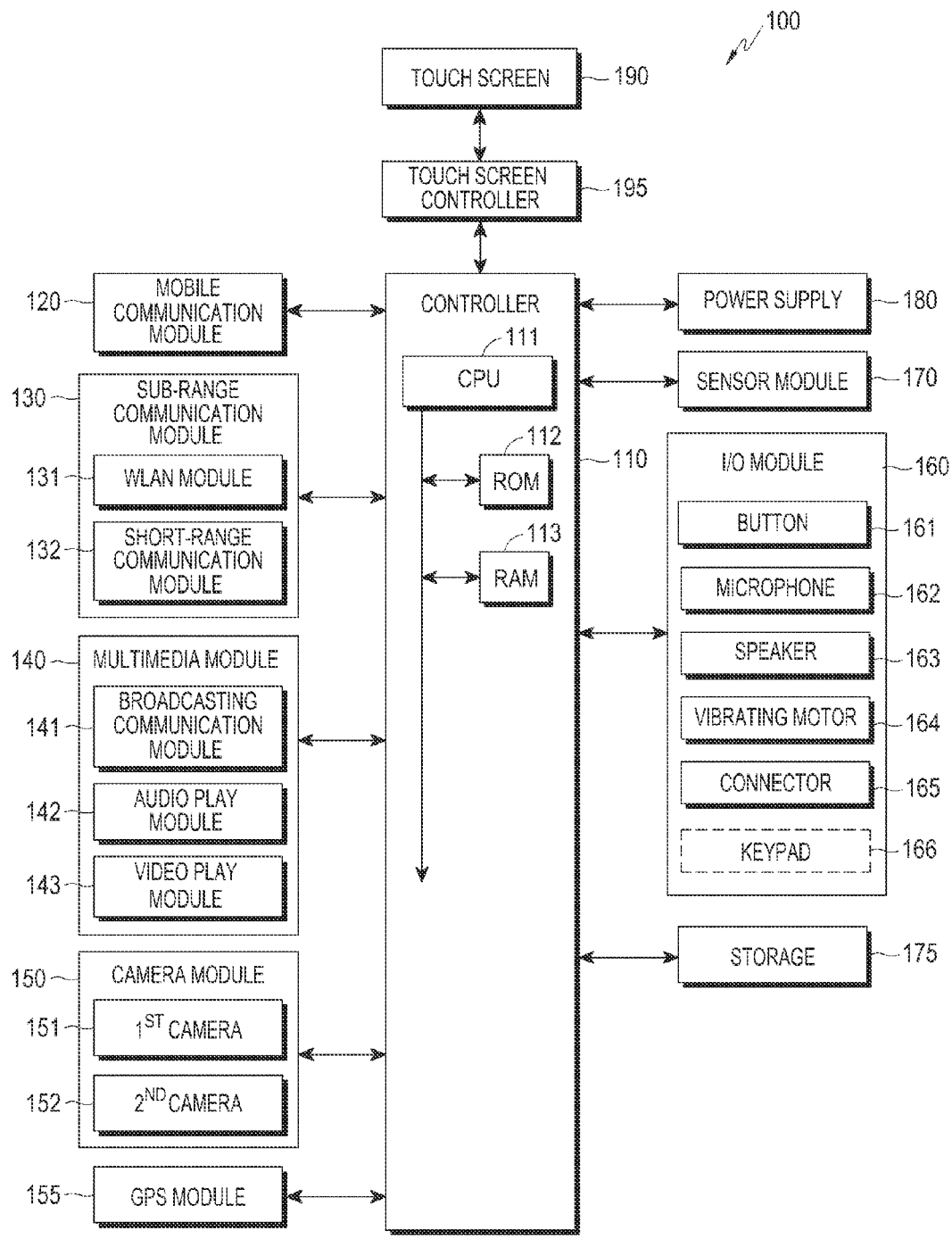
FIG. 1 is a block diagram of a mobile device according to an embodiment of the present disclosure.

FIG. 1 is a block diagram of a mobile device according to an embodiment of the present disclosure.

Referring to FIG. 1, a mobile device 100 may be connected to an external device (not shown) through a mobile communication module 120, a sub-communication module 130, and a connector 165. The 'external 'device' may be any of another mobile device (not shown), a portable phone (not shown), a smart phone (not shown), a tablet Personal Computer (PC) (not shown), a server (not shown), and the like.

The mobile device 100 includes a touch screen 190 and a touch screen controller 195. The mobile device 100 further includes a controller 110, the mobile communication module 120, the sub-communication module 130, a multimedia module 140, a camera module 150, a Global Positioning System (GPS) module 155, an Input/Output (I/O) module 160, a sensor module 170, a memory 175, and a power supply 180. The sub-communication module 130 includes at least one of a Wireless Local Area Network (WLAN) module 131 or a short-range communication module 132, and the multimedia module 140 includes at least one of a broadcasting communication module 141, an audio play module 142, or a video play module 143. The camera module 150 includes at least one of a first camera 151 or a second camera 152, and the I/O module 160 includes at least one of buttons 161, a microphone 162, a speaker 163, a vibration motor 164, the connector 165, or a keypad 166.

The controller 110 may include a Central Processing Unit (CPU) 111, a Read Only Memory (ROM) 112 that stores a control program to control the mobile device 100, and a Random Access Memory (RAM) 113 that stores signals or data received from the outside of the mobile device 100 or is used as a memory space for an operation performed by the mobile device 100. The CPU 111 may include a single core, dual cores, triple cores, or quadruple cores. The CPU 111, the ROM 112, and the RAM 113 may be connected to one another through an internal bus.

The controller 110 may control the mobile communication module 120, the sub-communication module 130, the multimedia module 140, the camera module 150, the GPS module 155, the I/O module 160, the sensor module 170, the memory 175, the power supply 180, the touch screen 190, and the touch screen controller 195.

The mobile communication module 120 connects the mobile device 100 to an external device through one or more antennas (not shown) by mobile communication under the control of the controller 110. The mobile communication module 120 transmits wireless signals or receives wireless signals to or from a portable phone (not shown), a smart phone (not shown), a tablet PC (not shown), or another mobile device (not shown) that has a phone number input to the mobile device 100, for a voice call, a video call, a Short Message Service (SMS), or a Multimedia Messaging Service (MMS).

The sub-communication module 130 may include at least one of the WLAN module 131 or the short-range communication module 132. For example, the sub-communication module 130 may include the WLAN module 131 or the short-range communication module 132 alone or both.

The WLAN module 131 may be connected to the Internet under the control of the controller 110 in a place where a wireless AP (not shown) is installed. The WLAN module 131 supports the WLAN standard of the Institute of Electrical and Electronics Engineers (IEEE), IEEE802.11x. The short-range communication module 132 may conduct short-range wireless communication between the mobile device 100 and an image forming device (not shown) under the control of the controller 110. The short-range communication may conform to Bluetooth, Infrared Data Association (IrDA), or the like.

The mobile device 100 may include at least one of the mobile communication module 120, the WLAN module 131, or the short-range communication module 132 according to its capabilities. For example, the mobile device 100 may include a combination of the mobile communication module 120, the WLAN module 131, and the short-range communication module 132 according to its capabilities.

The multimedia module 140 may include the broadcasting communication module 141, the audio play module 142, or the video play module 143. The broadcasting communication module 141 may receive a broadcast signal (e.g., a TV broadcast signal, a radio broadcast signal, a data broadcast signal, and the like) and additional broadcasting information (e.g., an Electronic Program Guide (EPG), Electronic Service Guide (ESG), and the like) from a broadcasting station through a broadcasting communication antenna (not shown) under the control of the controller 110. The audio play module 142 may open a stored or received digital audio file (for example, a file having such an extension as mp3, wma, ogg, or way) under the control of the controller 110. The video play module 143 may open a stored or received digital video file (for example, a file having such an extension as mpeg, mpg, mp4, avi, mov, or mkv) under the control of the controller 110. The video play module 143 may also open a digital audio file.

The multimedia module 140 may include the audio play module 142 and the video play module 143 without the broadcasting communication module 141. Alternatively, the audio play module 142 or the video play module 143 of the multimedia module 140 may be incorporated into the controller 110.

The camera module 150 may include at least one of the first camera 151 or the second camera 152, for capturing a still image or a video under the control of the controller 110. Further, the first camera 151 or the second camera 152 may include an auxiliary light source (e.g., a flash (not shown)) that provides a light intensity used to capture an image. The first camera 151 may be disposed on the front surface of the mobile device 100, while the second camera 152 may be disposed on the rear surface of the device 100. Alternatively, the first camera 151 and the second camera 152 may be arranged near to each other (for example, the distance between the first camera 151 and the second camera 152 is between 1 cm and 8 cm) in order to capture a three-dimensional still image or video.

The GPS module 155 may receive signal waves from a plurality of GPS satellites (not shown) in Earth's orbit and determine a position of the mobile device 100 based on the Time of Arrivals (ToAs) of satellite signals from the GPS satellites to the mobile device 100.

The I/O module 160 may include at least one of the plurality of buttons 161, the microphone 162, the speaker 163, the vibration motor 164, the connector 165, or the keypad 166.

The buttons 161 may be formed on the front surface, a side surface, or the rear surface of a housing of the mobile device 100, and may include at least one of a power/lock button, a volume button, a menu button, a home button, a back button, a search button, or the like.

The microphone 162 receives a voice or a sound and converts the received voice or sound to an electrical signal under the control of the controller 110.

The speaker 163 may output sounds corresponding to various signals (e.g., a wireless signal, a broadcast signal, a digital audio file, a digital video file, a photo shot, and the like) received from the mobile communication module 120, the sub-communication module 130, the multimedia module 140, and the camera module 150 to the outside of the mobile device 100. The speaker 163 may output sounds corresponding to functions (e.g., a button manipulation sound, a ringback tone for a call, and the like) performed by the mobile device 100. One or more speakers 163 may be disposed at an appropriate position or positions of the housing of the mobile device 100.

The vibration motor 164 may convert an electrical signal to a mechanical vibration under the control of the controller 110. For example, when the electronic device 100 receives an incoming voice call from another device (not shown) in a vibration mode, the vibration motor 164 operates. One or more vibration motors 164 may be mounted inside the housing of the electronic device 100. The vibration motor 164 may operate in response to a user's touch on the touch screen 190 and a continuous movement of the touch on the touch screen 190.

The connector 165 may be used as an interface to connect the mobile device 100 to an external device (not shown) or a power source (not shown). The connector 165 may transmit data stored in the memory 175 to the external device via a cable connected to the connector 165 or may receive data from the external device via the cable, under the control of the controller 110. The mobile device 100 may receive power or charge a battery (not shown) from the power source via the cable connected to the connector 165.

The keypad 166 may receive a key input from the user to control the mobile device 100. The keypad 166 includes a physical keypad (not shown) formed in the mobile device 100 or a virtual keypad (not shown) displayed on the touch screen 190. The physical keypad may not be provided according to the capabilities or configuration of the mobile device 100.

The sensor module 170 includes at least one sensor to detect a state of the mobile device 100. For example, the sensor module 170 may include a proximity sensor to detect whether the user is close to the mobile device 100, an illumination sensor (not shown) to detect the amount of ambient light around the mobile device 100, a motion sensor (not shown) to detect a motion of the mobile device 100 (e.g., a rotation, an acceleration, a vibration, and the like, of the mobile device 100), and the like. At least one sensor may detect a state of the mobile device 100, generate a signal corresponding to the detected state, and transmit the generated signal to the controller 110. A sensor may be added to or removed from the sensor module 170 according to the capabilities of the mobile device 100.

The memory 175 may store input/output signals or data in accordance with operations of the mobile communication module 120, the sub-communication module 130, the multimedia module 140, the camera module 150, the GPS module 155, the I/O module 160, the sensor module 170, and the touch screen 190 under the control of the controller 110. The memory 175 may store a control program to control the mobile device 100 or the controller 110, and applications.

The term "memory" may include the memory 175, the ROM 112 and the RAM 113 within the controller 110, or a memory card (not shown) (e.g., a Secure Digital (SD) card, a memory stick, and the like) mounted to the mobile device 100. The memory may include a non-volatile memory, a volatile memory, a Hard Disk Drive (HDD), a Solid State Drive (SSD), and the like.

The power supply 180 may supply power to one or more batteries (not shown) mounted in the housing of the mobile device 100 under the control of the controller 110. The one or more batteries supply power to the mobile device 100. Further, the power supply 180 may supply power received from an external power source (not shown) via the cable connected to the connector 165 to the mobile device 100.

The touch screen 190 may provide User Interfaces (UIs) corresponding to various services (e.g., a call, a data transmission, a broadcasting, a photo taking, and the like) to the user. The touch screen 190 may transmit an analog signal corresponding to at least one touch on a UI to the touch screen controller 195. The touch screen 190 may receive at least one touch input through a user's body part (e.g., a finger) or a touch input tool (e.g., a stylus pen). In addition, the touch screen 190 may receive a touch input signal corresponding to a continuous movement of a touch among one or more touches. The touch screen 190 may transmit an analog signal corresponding to the continuous movement of the input touch to the touch screen controller 195.

In embodiments of the present disclosure, 'touch' may include a non-contact touch (e.g., the touch screen 190 is spaced from the user's body part or the touch input tool by 1 mm or less), not limited to contacts between the touch screen 190 and the user's body part or the touch input tool. A gap detectable to the touch screen 190 may vary according to the capabilities or configuration of the mobile device 100.

The touch screen 190 may be implemented by, for example, a resistive type, a capacitive type, an infrared type, an acoustic wave type, or a combination of two or more of them.

The touch screen controller 195 converts an analog signal received from the touch screen 190 to a digital signal (e.g., X and Y coordinates). The controller 110 may control the touch screen 190 using the digital signal received from the touch screen controller 195. For example, the controller 110 may control selection or execution of a shortcut icon (not shown) displayed on the touch screen 190 in response to a touch. The touch screen controller 195 may be incorporated into the controller 110.

A communication method is intended to perform a Wi-Fi Display (WFD) operation between a first terminal serving as a Group Owner (GO) and a second terminal serving as a Group Client (GC). The communication method is applicable to an operation of processing audio or video streaming data after a connection is established between the first and second terminals. More particularly when a session of streaming audio or video data starts, an active period and an idle period are set by adapting a data rate to a capability requirement for transmission of audio or video streaming data.

Figure 2:
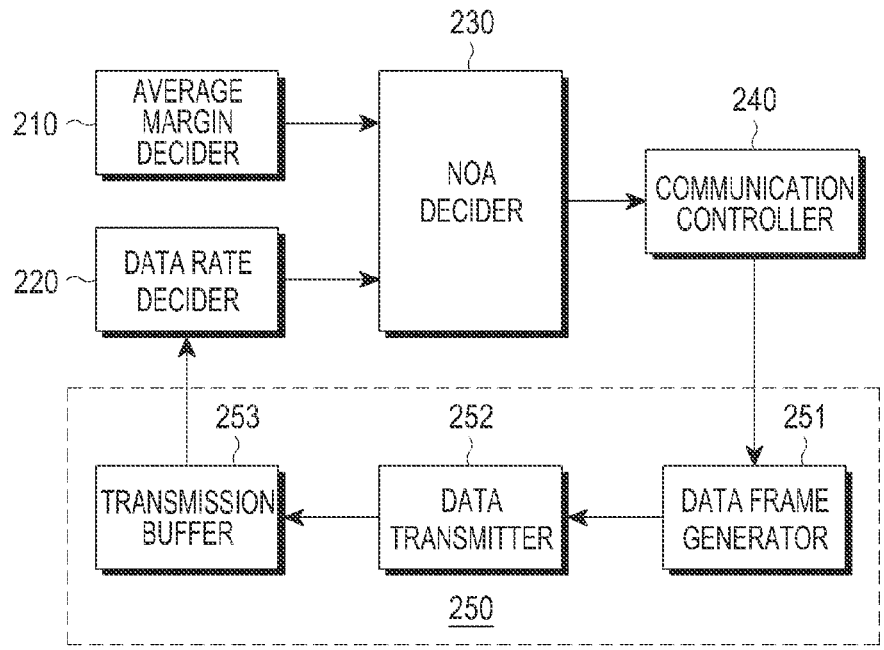
FIG. 2 is a block diagram of an apparatus using a method of setting a data transmission period according to an embodiment of the present disclosure.

FIG. 2 is a block diagram of an apparatus using a method of setting a data transmission period according to an embodiment of the present disclosure.

Referring to FIG. 2, the apparatus includes an average margin decider 210 to determine an average margin threshold, a data rate decider 220 to determine a data rate, a Notice Of Absence (NOA) decider 230 to determine an active period and an idle period, and a data transceiver 250 to transmit data during an active period and control data that controls an idle-mode operation of the mobile device 100 during the idle period. The average margin decider 210, the data rate decider 220, and the NOA decider 230 may be provided in the controller 110 of the mobile device 100, and the data transceiver 250 may be provided in a communication module that processes data transmission and reception during a WFD operation. For example, the data transceiver 250 may be provided in the WLAN module 131 or the short-range communication module 132.

The average margin decider 210 calculates an average margin threshold based on a maximum margin threshold and a minimum margin threshold.

Figure 3:
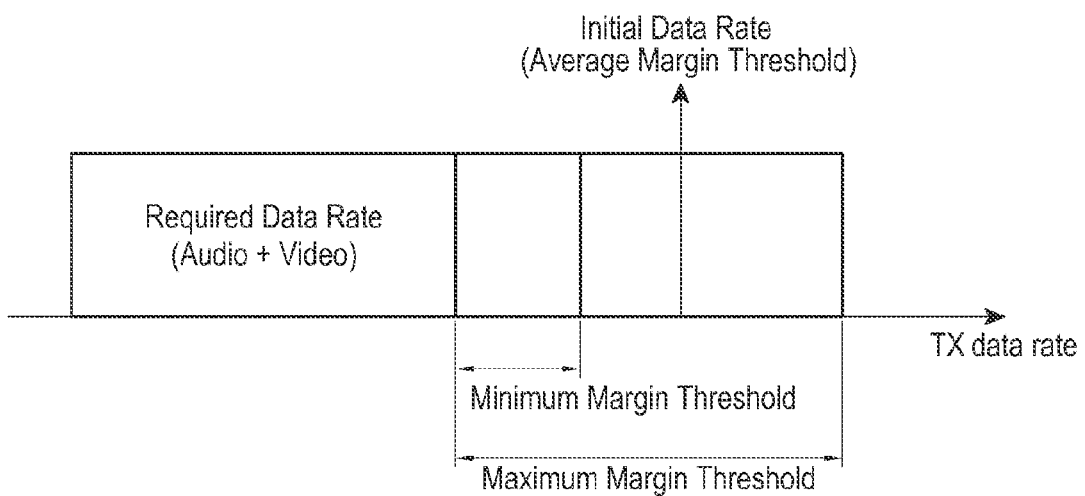
FIG. 3 illustrates an average margin threshold used in a method of setting a data transmission period according to an embodiment of the present disclosure.

FIG. 3 illustrates an average margin threshold used in a method of setting a data transmission period according to an embodiment of the present disclosure.

Referring to FIG. 3, the maximum margin threshold is a maximum capability used to transmit audio or video streaming data, and the minimum margin threshold is a minimum capability used to transmit audio or video streaming data, during a WFD operation. The average margin threshold is the mean value of the maximum and minimum margin thresholds.

Referring back to FIG. 2, the data rate decider 220 determines the data rate of data transmitted from the first terminal to the second terminal. The data rate decider 220 determines a data rate based on the amount of data output from a transmission buffer 253 of the data transceiver 250. Specifically, the data rate decider 220 measures an average data rate of the transmission buffer 253 for a certain time (e.g., one second) and sets the average data rate as a measured data rate. Because the transmission buffer 253 is disposed at the forefront end of data transmission and a data rate is determined based on the amount of data output from the transmission buffer 253, a data transmission state may be effectively detected, which appropriately reflects a radio channel state, a traffic load, and the like.

The data rate decider 220 measures the average data rate of the transmission buffer 253 periodically at every time interval.

The NOA decider 230 determines an active period and an idle period based on the average margin threshold and the measured data rate. Specifically, the NOA decider 230 calculates a ratio of an active period by Equation 1 and determines the active period and the idle period based on the calculated active period ratio.

$$\text{Active Period Ratio} = \frac{\text{Average Margin Threshold}}{\text{Data Rate Measurement}} \times NOA \text{ Interval} \quad \text{Equation 1}$$

The active period alternates with the idle period periodically. Data is transmitted during the active period, while the first terminal serving as a GO maintains the second terminal serving as a GC in an idle state during the idle period in order to reduce power consumption of the second terminal. In Equation 1, NOA Interval is a period in which the active period and the idle period are repeated.

The data rate determined based on the amount of data output from the transmission buffer 253 may vary according to a change in a radio channel state, a traffic load, and the like. Accordingly, the NOA decider 230 may compare the measured data rate with the maximum and minimum margin thresholds and re-set the active period and the idle period in real time based on the comparison result, so that the varying data rate may be reflected. Specifically, if the measured data rate is between the maximum and minimum margin thresholds, the NOA decider 230 maintains the current active and idle periods. If the measured data rate is larger than the maximum margin threshold, the NOA decider 230 re-sets the active period and the idle period by decreasing the ratio of the active period by a certain value (e.g., a rate calculated by Equation 2). If the measured data rate is smaller than the minimum margin threshold, the NOA decider 230 re-sets the active period and the idle period by increasing the ratio of the active period by a certain value (e.g., a rate calculated by Equation 3).

$$\text{Increase Rate} = \frac{\text{Data Rate Measurement} - \text{Maximum Margin Threshold}}{\text{Maximum Margin Threshold}} \quad \text{Equation 2}$$

$$\text{Increase Rate} = \frac{\text{Minimum Margin Threshold} - \text{Data Rate Measurement}}{\text{Minimum Margin Threshold}} \quad \text{Equation 3}$$

Further, the NOA decider 230 notifies a communication controller 240 of the determined active and idle periods. The communication controller 240 controls the data transceiver 250 to transmit data to at least one second terminal connected for a WFD operation during the active period and maintains the first terminal in the idle state during the idle period. In addition, the communication controller 240 controls transmission of information about the determined active and idle periods to the least one second terminal so that the at least one second terminal is placed in the idle state during the idle period. The information about the determined active and idle periods is transmitted at every interval or each time the active period ratio or the active and idle periods are changed.

The data transceiver 250 may include a data frame generator 251, a data transmitter 252, and the transmission buffer 253. The communication controller 240 commands transmission of the information about the active and idle periods to the data frame generator 251. Thereafter, the data frame generator 251 receives the information about the active and idle periods from the NOA decider 230 and generates a data frame including the information about the active and idle periods.

The data transmitter 252 transmits the data frame received from the data frame generator 251 to the at least one second terminal through the transmission buffer 253 during the active period in conformance to a certain communication protocol.

The information about the active and idle periods may be transmitted in a beacon, a Probe Response message, or a NOA frame. If the communication controller 240 commands generation of a frame corresponding to at least one of a beacon, a Probe Response message, or a NOA frame to the data frame generator 251, the data frame generator 251 may generate a data frame including the information about the active and idle periods in response to the command.

Figure 4A:
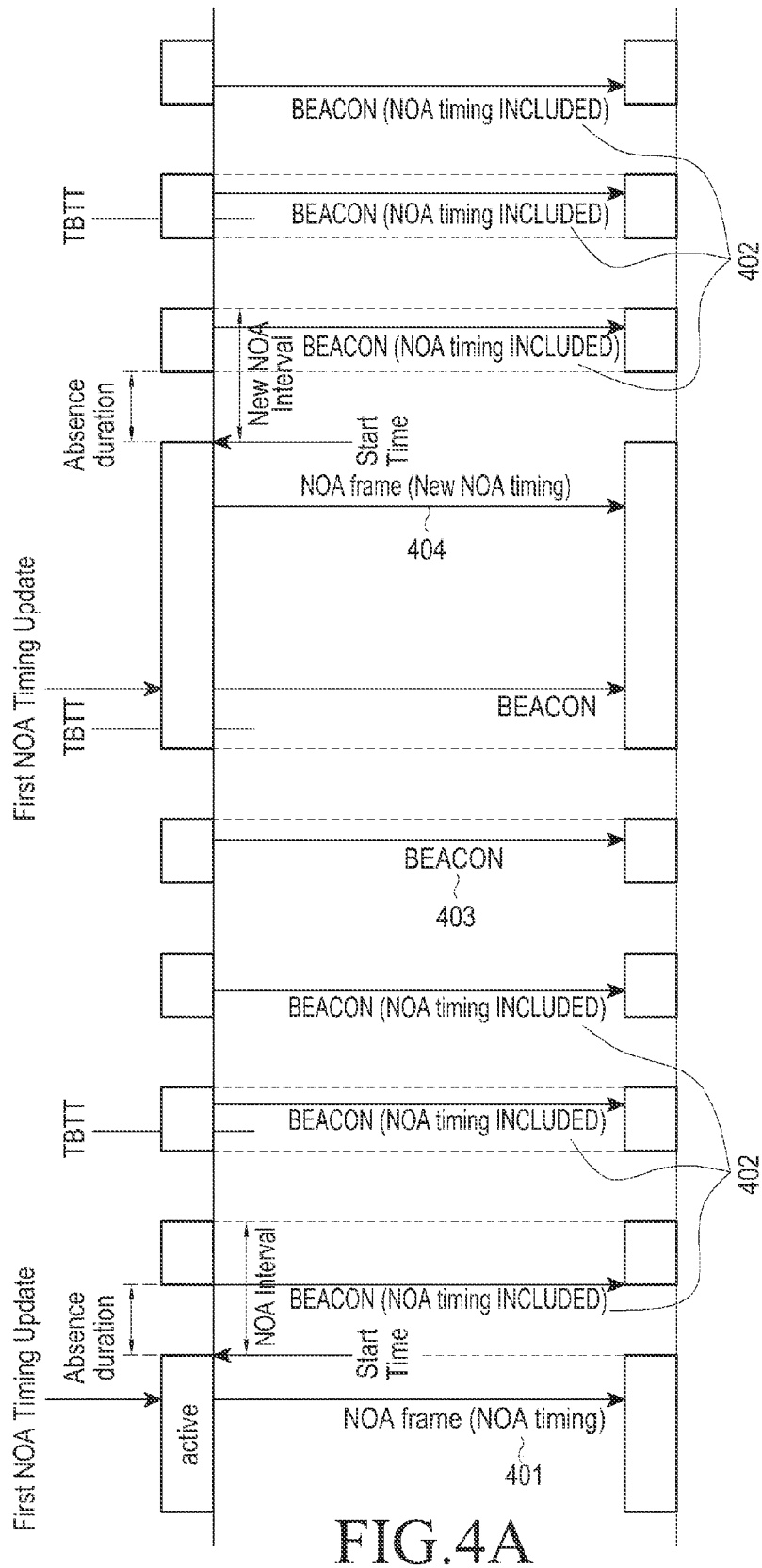
FIGS. 4A and 4B illustrate a method of transmitting information about an active period and an idle period according to a method of setting a data transmission period according to an embodiment of the present disclosure.
Figure 4B:
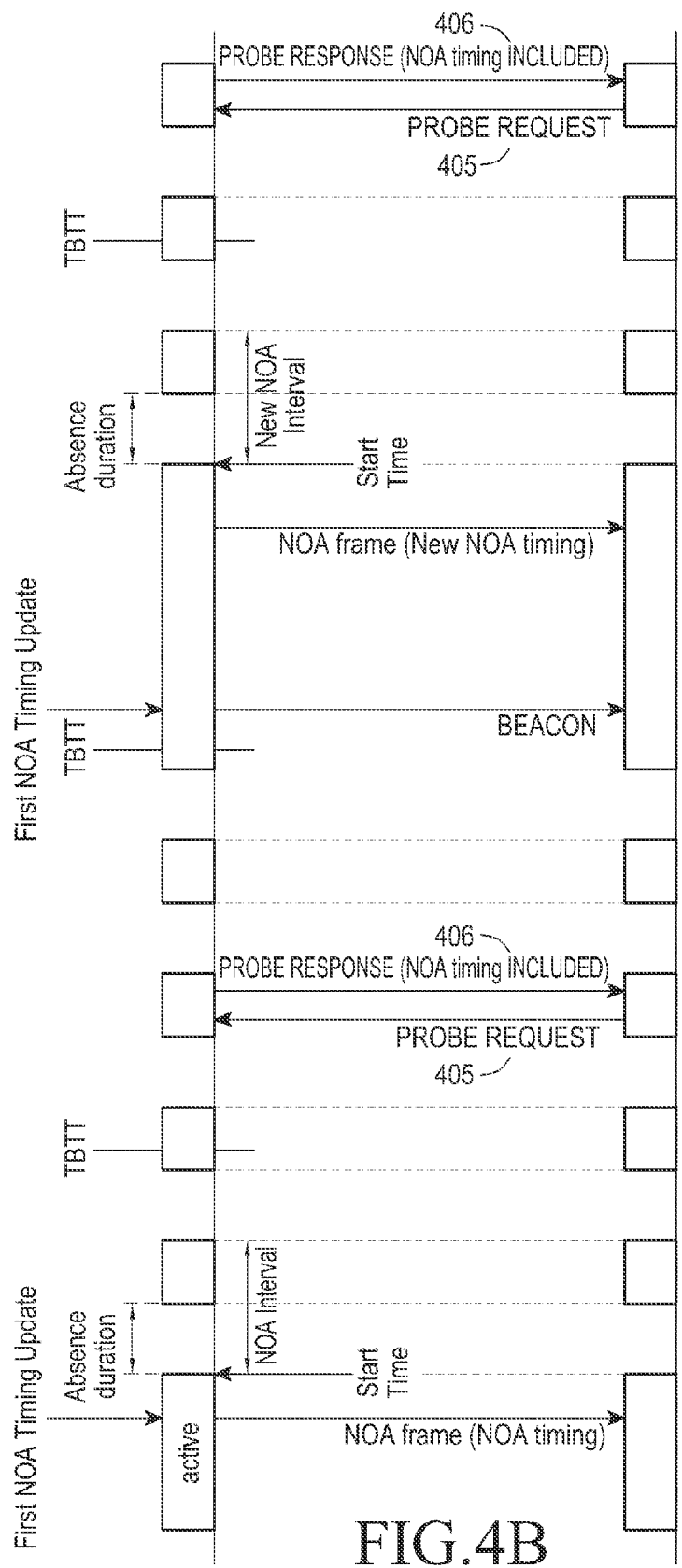

FIGS. 4A and 4B illustrate a method of transmitting information about an active period and an idle period according to a method of setting a data transmission period according to an embodiment of the present disclosure.

Referring to FIG. 4A, the communication controller 240 commands generation of a NOA frame 401 including information about active and idle periods to the data frame generator 251 during an initial connection setup with at least one second terminal. The data frame generator 251 generates the NOA frame 401 and provides the NOA frame 401 to the data transmitter 252 so that the data transmitter 252 may transmit the NOA frame 401 to the at least one second terminal Subsequently, the communication controller 240 controls periodic transmission of information about active and idle periods to the at least one second terminal in a beacon 402 that is generated periodically at every interval in the first terminal. For example, the communication controller 240 commands transmission of the information about the active and idle periods in the beacon 402 to the data frame generator 251. The data frame generator 251 configures the beacon 402 to include the information about the active and idle periods and transmits the beacon 402 to the data transmitter 252 so that the data transmitter 252 may transmit the beacon 402 to the at least one second terminal periodically at every interval.

The communication controller 240 may provide information about active and idle periods, reflecting a process result of the NOA decider 230. Specifically, if the NOA decider 230 determines to maintain current active and idle periods, the communication controller 240 controls periodic transmission of information about the active and idle periods in a beacon. On the other hand, if the NOA decider 230 determines to adjust an active period ratio, that is, determines to increase or decrease the active period ratio, the communication controller 240 controls the data frame generator 251 to configure a periodically transmitted beacon 403 without the information about the active and idle periods. Additionally, the communication controller 240 provides information about active and idle periods determined based on the adjusted active period ratio (i.e., information about updated active and idle periods) and thus, commands generation of a NOA frame 404 including the information about the updated active and idle periods to the data frame generator 251. The data frame generator 251 generates the NOA frame 404 and transmits the generated NOA frame 404 to the data transmitter 252 so that the data transmitter 252 may transmit the NOA frame 404 to the at least one second terminal.

Because the beacon 403 generated from the data frame generator 251 does not include information about active and idle periods, the at least one second terminal determines that the active and idle periods have been changed. Thereafter, the at least one second terminal operates to receive the NOA frame 404 including the information about the updated active and idle periods from the first terminal during the next active period.

While it has been described in the above embodiment of the present disclosure that the first terminal transmits information about active and idle periods to the at least one second terminal in a beacon that is periodically generated at every interval, the present disclosure is not limited to the specific embodiment.

Referring to FIG. 4B, for example, the at least one second terminal may request information about active and idle periods by transmitting a Probe Request message 405 and receive the information about the active and idle periods by a Probe Response message 406, rather than a periodically generated beacon is used. In this case, the communication controller 240 identifies a message received through a data receiver (not shown). If the received message is the Probe Request message 405 requesting information about active and idle periods, the communication controller 240 may control the data frame generator 251 to generate the Probe Response message 406 including the information about the active and idle periods.

The Probe Request message 405 and the Probe Response message 406 may be used along with a beacon or independently of a beacon. For example, the at least one terminal may generate the Probe Request message 405 in addition to periodic reception of a beacon including information about active and idle periods as in the afore-described embodiment. Alternatively, when the at least one second terminal generates the Probe Request message 405, the Probe Response message 406 including information about active and idle periods may be generated, while a periodically generated beacon is configured not to include the information about the active and idle periods.

Figure 5:
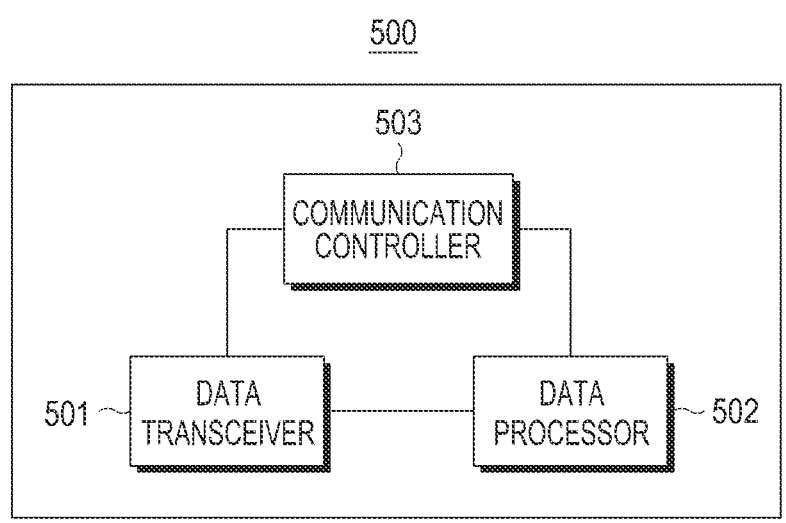
FIG. 5 is a block diagram of an apparatus using a method of setting a data transmission period according to an embodiment of the present disclosure.

FIG. 5 is a block diagram of an apparatus using a method of setting a data transmission period according to an embodiment of the present disclosure. More particularly, the configuration of a second terminal serving as a GC is illustrated in FIG. 5.

Referring to FIG. 5, a second terminal 500 may include a data transceiver 501 to receive data from a first terminal serving as a GO, a data processor 502 to identify and process the received data, and a communication controller 503 to control operations of the data transceiver 501 and the data processor 502. More particularly, the data processor 502 detects information about active and idle periods in a NOA frame (or a beacon) among received data frames and provides the detected information about the active and idle periods to the communication controller 503. The communication controller 503 controls an active or inactive (i.e., an idle-mode operation) timing of the data transceiver 501 and the data processor 502 according to the active and idle periods.

The data processor 502 may generate a Probe Request message for requesting information about active and idle periods and transmits the Probe Request message to the first terminal through the data transceiver 501. The data processor 502 may also provide information about active and idle periods included in a Probe Response message received from the first terminal to the communication controller 503. Accordingly, the communication controller 503 controls an active or inactive (i.e., an idle-mode operation) timing of the data transceiver 501 and the data processor 502 according to the active and idle periods.

Now a description will be given of operations of the afore-described apparatuses to which the method of setting a data transmission period is applied.

Figure 6:
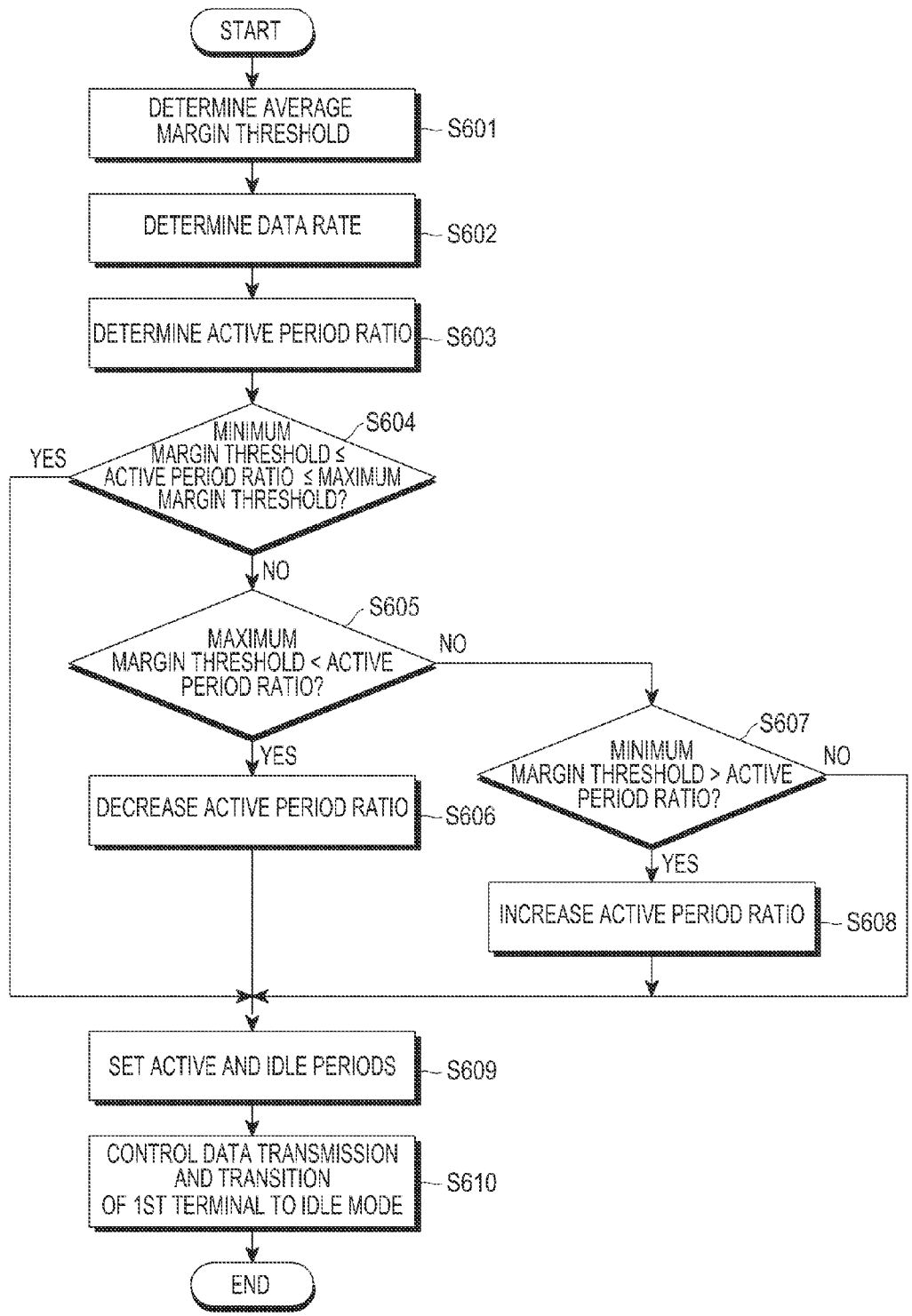
FIG. 6 is a flowchart illustrating a method of setting a data transmission period according to an embodiment of the present disclosure.

FIG. 6 is a flowchart illustrating a method of setting a data transmission period according to an embodiment of the present disclosure.

Referring to FIG. 6, when a session of streaming audio or video data starts after the first terminal serving as a GO establishes a WFD connection with the second terminal serving as a GC, the average margin decider 210 determines a maximum margin threshold being a maxim capability used for transmission of audio or video streaming data and a minimum margin threshold being a minim capability requirement for transmission of audio or video streaming data and calculates an average margin threshold using the maximum and minimum margin thresholds at operation S601.

The data rate decider 220 measures a data rate based on the amount of data output from the transmission buffer 253 of the data transceiver 250 at operation S602.

The NOA decider 230 determines an active period ratio based on the average margin threshold received from the average margin decider 210 and the measured data rate received from the data rate decider 220 at operation S603. Specifically, the NOA decider 230 determines the active period ratio by Equation 1.

The data rate determined based on the amount of data output from the transmission buffer 253 may vary according to a change in a radio channel state, a traffic load, and the like. Accordingly, to consistently reflect the varying data rate, the NOA decider 230 compares the measured data rate with the maximum and minimum margin thresholds and reflects the comparison result in determining active and idle periods in real time in the embodiment of the present disclosure. For this purpose, the NOA decider 230 determines whether the measured data rate is between the maximum and minimum margin thresholds at operation S604. If the measured data rate is between the maximum and minimum margin thresholds, the NOA decider 230 proceeds to operation S609 in order to set active and idle periods based on the determined active period ratio.

If the measured data rate is not between the maximum and minimum margin thresholds at operation S604, the NOA decider 230 determines whether the measured data rate is larger than the maximum margin threshold at operation S605. If the measured data rate is larger than the maximum margin threshold, the NOA decider 230 decreases the active period ratio by a certain value (e.g., a rate calculated by Equation 2) at operation S606.

If the measured data rate does not exceed the maximum margin threshold at operation S605, the NOA decider 230 determines whether the measured data rate is smaller than the minimum margin threshold at operation S607. If the measured data rate is smaller than the minimum margin threshold at operation S607, the NOA decider 230 increases the active period ratio by a certain value (e.g., a rate calculated by Equation 3) at operation S608. On the other hand, if the measured data rate is not smaller than the minimum margin threshold at operation S607, the NOA decider 230 proceeds to operation S609.

At operation S609, the NOA decider 230 sets the active and idle periods based on the active period ratio determined at operation S603, S606, or S608.

Thereafter, the communication controller 240 controls data transmission and transition of the first terminal to the idle mode according to the active and idle periods at operation S610.

At operation S610, the communication controller 240 may command transmission of information about the active and idle periods to the data frame generator 251. The data frame generator 251 receives the information about the active and idle periods from the NOA decider 230 and generates a data frame including the information about the active and idle periods, in response to the command.

Further, the communication controller 240 may control transmission of the information about the active and idle periods in a beacon, a Probe Response message, a NOA frame, or the like.

The information about the active and idle periods generated in the above method of setting a data transmission period may be transmitted in a beacon. Specifically, the communication controller 240 commands generation of the NOA frame 401 including the information about the active and idle periods to the data frame generator 251 during an initial connection setup with the at least one second terminal. The data frame generator 251 generates the NOA frame 401 and provides the NOA frame 401 to the data transmitter 252 so that the data transmitter 252 may transmit the NOA frame 401 to the at least one second terminal. Subsequently, the communication controller 240 controls periodic transmission of information about active and idle periods to the at least one second terminal in a beacon 402 that is generated periodically at every interval in the first terminal. For example, the communication controller 240 commands transmission of the information about the active and idle periods in the beacon 402 to the data frame generator 251. The data frame generator 251 configures the beacon 402 to include the information about the active and idle periods and transmits the beacon 402 to the data transmitter 252 so that the data transmitter 252 may transmit the beacon 402 to the at least one second terminal periodically at every certain interval.

The communication controller 240 may provide information about active and idle periods, reflecting a process result of the NOA decider 230. Specifically, if the NOA decider 230 determines to maintain current active and idle periods, the communication controller 240 controls periodic transmission of information about the active and idle periods in a beacon. On the other hand, if the NOA decider 230 determines to adjust an active period ratio, that is, determines to increase or decrease the active period ratio, the communication controller 240 controls the data frame generator 251 to configure a periodically transmitted beacon 403 without the information about the active and idle periods. Additionally, the communication controller 240 provides information about active and idle periods determined based on the adjusted active period ratio (i.e., information about updated active and idle periods) and thus, commands generation of the NOA frame 404 including the information about the updated active and idle periods to the data frame generator 251. The data frame generator 251 generates the NOA frame 404 and transmits the generated NOA frame 404 to the data transmitter 252 so that the data transmitter 252 may transmit the NOA frame 404 to the at least one second terminal.

Because the beacon 403 generated from the data frame generator 251 does not include information about active and idle periods, the at least one second terminal determines that the active and idle periods have been changed. Thereafter, the at least one second terminal operates to receive the NOA frame 404 including the information about the updated active and idle periods from the first terminal during the next active period.

In an alternative embodiment of transmitting information about active and idle periods to the at least one second terminal in a beacon, the at least one second terminal may request information about active and idle periods by transmitting the Probe Request message 405 and receive the information about the active and idle periods by the Probe Response message 406. In this case, the communication controller 240 identifies a message received through the data receiver (not shown). If the received message is the Probe Request message 405 requesting information about active and idle periods, the communication controller 240 may control the data frame generator 251 to generate the Probe Response message 406 including the information about the active and idle periods.

The Probe Request message 405 and the Probe Response message 406 may be used along with a beacon or independently of a beacon. For example, the at least one terminal may generate the Probe Request message 405 in addition to periodic reception of a beacon including information about active and idle periods as in the afore-described embodiment. Alternatively, when the at least one second terminal generates the Probe Request message 405, the Probe Response message 406 including information about active and idle periods may be generated, while a periodically generated beacon is configured not to include the information about the active and idle periods.

As is apparent from the above description of the present disclosure, when streaming data is transmitted, power consumption can be minimized without degrading service quality in a WFD system.

Since a radio channel environment is effectively predicted using a data rate determined based on the amount of data output from a transmission buffer, power efficiency can be maximized without a complicated operation of measuring the radio channel environment or performance degradation.

Furthermore, even a mobile terminal having a relatively low power source can transmit streaming data by WFD.

At this point it should be noted that the embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the embodiments of the present disclosure as described above. Alternatively, one or more processors operating in accordance with stored instructions may implement the functions associated with the embodiments of the present disclosure as described above. If such is the case, it is within the scope of the present disclosure that such instructions may be stored on one or more processor readable mediums. Examples of the processor readable mediums include a ROM, a RAM, a Compact Disc (CD)-ROM, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of setting a data transmission and reception period for communication with a second terminal serving as group client in a first terminal serving as a group owner having a memory, the first terminal having a Wi-Fi data connection with the second terminal, and the memory having stored thereon instructions that when executed, configure the first terminal to perform the method comprising:
   determining an average margin threshold according to a mean value of a maximum margin threshold and a minimum margin threshold for data communication with the second terminal, wherein the maximum margin threshold is a maximum capability used to transmit data, and the minimum margin threshold is a minimum capability used to transmit data, during a Wi-Fi display operation;
   determining a data rate for the data communication with the second terminal based on amount of data outputted from a transmission buffer of the first terminal;
   setting an active period and an idle period based on a ratio of the average margin threshold to the data rate for the data communication with the second terminal; and
   synchronizing the active period and the idle period with the second terminal.

2. The method of claim 1, further comprising instructions that when executed, further configure the first terminal to perform resetting the active period and the idle period by updating the data rate.

3. The method of claim 1, wherein the determining of the average margin threshold comprises setting the average margin threshold to a mean value of a maximum margin threshold and a minimum margin threshold.

4. The method of claim 1, wherein the setting of the active period and the idle period comprises calculating the ratio of the average margin threshold to the data rate and determining the active period by applying the ratio of the average margin threshold to the data rate to a ratio of the idle period to the active period.

5. The method of claim 1, further comprising instructions that when executed, further configure the first terminal to perform:
   determining a relationship among the data rate, a maximum margin threshold, and a minimum margin threshold, the average margin threshold being determined based on the maximum margin threshold and the minimum margin threshold; and
   increasing a ratio of the active period, if the data rate is smaller than the minimum margin threshold.

6. The method of claim 5, further comprising instructions that when executed, further configure the first terminal to perform decreasing the ratio of the active period, if the data rate is larger than the maximum margin threshold.

7. The method of claim 5, further comprising instructions that when executed, further configure the first terminal to perform maintaining the ratio of the active period, if the data rate is between the maximum margin threshold and the minimum margin threshold.

8. An apparatus for setting a data transmission and reception period for communication with a second terminal serving as group client in a first terminal serving as a group owner, the first terminal having a Wi-Fi data connection with the second terminal, the apparatus comprising:
   a touch sensitive display;
   at least one memory;
   at least one communication module;

a controller; and one or more programs, the one or more programs being stored in the at least one memory and configured to be executed by the controller, the one or more programs including instructions to:

determine an average margin threshold according to a mean value of a maximum margin threshold and a minimum margin threshold for data communication with the second terminal, wherein the maximum margin threshold is a maximum capability used to transmit data, and the minimum margin threshold is a minimum capability used to transmit data, during a Wi-Fi display operation;

determine a data rate for the data communication with the second terminal based on amount of data outputted from a transmission buffer of the first terminal;

set an active period and an idle period based on a ratio of the average margin threshold to the data rate for the data communication with the second terminal; and control the at least one communication module to transmit and receive data in the active period and the idle period.

9. The apparatus of claim 8, wherein the one or more programs further include instructions to set the average margin threshold to a mean value of a maximum margin threshold and a minimum margin threshold.

10. The apparatus of claim 8, wherein the one or more programs further include instructions to:
   calculate the ratio of the average margin threshold to the data rate, and
   determine the active period by applying the ratio of the average margin threshold to the data rate to a ratio of the idle period to the active period.

11. The apparatus of claim 8, wherein the one or more programs further include instructions to:
   determine a relationship among the data rate, a maximum margin threshold, and a minimum margin threshold, the average margin threshold being determined based on the maximum margin threshold and the minimum margin threshold, and
   increase a ratio of the active period, if the data rate is smaller than the minimum margin threshold.

12. The apparatus of claim 11, wherein, if the data rate is larger than the maximum margin threshold, the one or more programs further include instructions to decrease the ratio of the active period.

13. The apparatus of claim 11, wherein, if the data rate is between the maximum margin threshold and the minimum margin threshold, the one or more programs further include instructions to maintain the ratio of the active period.

* * * * *